(12) United States Patent
Shaub

(10) Patent No.: US 8,337,207 B1
(45) Date of Patent: Dec. 25, 2012

(54) DEPICTION OF THE EXISTENCE OF LIFE ON EARTH IN FOUR DIMENSIONS

(76) Inventor: F. Jeanne Shaub, Austin, TX (US)

( * ) Notice: Subject to any disclaimer, the term of this patent is extended or adjusted under 35 U.S.C. 154(b) by 454 days.

(21) Appl. No.: 12/657,003

(22) Filed: Jan. 12, 2010

Related U.S. Application Data

(60) Provisional application No. 61/206,331, filed on Jan. 29, 2009.

(51) Int. Cl.
 *G09B 25/06* (2006.01)
(52) U.S. Cl. ....................................... 434/130
(58) Field of Classification Search ................ 434/130, 434/131, 137, 147, 150, 151, 299, 365; 248/346.03; D6/405, 460
See application file for complete search history.

(56) References Cited

U.S. PATENT DOCUMENTS

| | | | | |
|---|---|---|---|---|
| 45,762 | A * | 1/1865 | Moberg | 426/307 |
| 3,556,047 | A | 1/1971 | Wassell | |
| 3,672,073 | A * | 6/1972 | Pilorusso | 434/211 |
| 3,720,008 | A | 3/1973 | Hutar | |
| 3,720,009 | A | 3/1973 | Hutar | |
| D238,319 | S * | 1/1976 | Stephenson | D6/460 |
| 3,943,646 | A | 3/1976 | Branham | |
| 3,968,573 | A | 7/1976 | Poliniere | |
| 4,115,930 | A | 9/1978 | Beck | |
| D250,372 | S * | 11/1978 | Szabo et al. | D6/455 |
| 4,142,306 | A | 3/1979 | Whitlock | |
| 4,365,434 | A * | 12/1982 | Doyel | 40/530 |
| 4,865,548 | A | 9/1989 | Snyder | |
| 4,937,181 | A | 6/1990 | Rogers | |
| 5,122,062 | A * | 6/1992 | Cutler et al. | 434/327 |
| D328,536 | S * | 8/1992 | Ma | D6/460 |
| 5,519,809 | A | 5/1996 | Hussein et al. | |
| 5,844,392 | A | 12/1998 | Peurach et al. | |
| 5,882,199 | A | 3/1999 | Bernardino | |
| 6,129,386 | A | 10/2000 | Brata | |
| 6,565,360 | B1 * | 5/2003 | Kavvouras | 434/284 |
| 6,641,400 | B1 | 11/2003 | Kennedy | |
| 6,651,364 | B2 | 11/2003 | Hermanson et al. | |
| 7,316,085 | B1 | 1/2008 | Freeman | |
| 7,331,790 | B1 * | 2/2008 | Shinozuka | 434/135 |
| D571,575 | S * | 6/2008 | Hunter | D6/455 |
| 7,654,826 | B2 | 2/2010 | Faulkner et al. | |
| 2003/0148252 | A1 * | 8/2003 | Drecksel | 434/299 |
| 2005/0247836 | A1 * | 11/2005 | Park | 248/214 |

OTHER PUBLICATIONS

Dr. E. C. Harris "Princples of Archaeological Stratigraphy," 1989, 136 pp. Academic Press, London + New York. See "1, " attached.
US National Park Service "National Archeological Database," ongoing Cover Page and Sample Map From Web Site Attached.
Jeremy Norman HistoryofScience.com Website and Datebase, ongoing. See Excerpt from Report on History of Information and Media, Attached.
Ohio State University Archaeology, Education Website, Ongoing. See Excerpt from "Classical Archaeology," Showing 1999 Survey Area, Attached.

* cited by examiner

Primary Examiner — Kurt Fernstrom

(57) ABSTRACT

The subject structure consists of a base, a spine rising from the base, and a group of Earth planetary illustrations affixed at intervals along the height of the spine. Colors, symbols, text, texture, and artifacts on an illustration represent specified characteristics of biological forms and planetary conditions for one or more sites on the Earth at a given time, past, present or future. The intervals between the locations of the illustrations along the height of the spine represent time intervals in the existence of Earth. This overall presentation therefore displays biological and environmental information on a global platform as conditions change through time. The information specified is drawn from published research and recognized researchers and is also recorded in and retrievable from an associated database.

1 Claim, 2 Drawing Sheets

DEPICTION OF THE EXISTENCE OF LIFE ON EARTH IN FOUR DIMENSIONS

CROSS-REFERENCE TO RELATED APPLICATIONS

U.S. Provisional Patent Application 61/206,331; Filing date, Jan. 29, 2009; Applicant, F. Jeanne Shaub; Title of Invention, Teaching Structure for Human History and Pre-History

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Field of the Invention

This invention concerns the biological record of Earth, floral and faunal, past, present, and future projections. It uses information on the characteristics of life forms, their origin, kind, numbers, locations, changes, interactions with other populations, and lifestyles, and also planetary conditions influencing life forms, including but not limited to climates and landforms, emergent and submerged, and the atmospheric and water columns. The invention includes a structure comprising a series of illustrations of the planet displaying items representing the characteristics of biological forms and their environments. Each planetary illustration represents a given time, and the series of illustrations represents an interval of time covering a number of years.

This structure is accompanied by a database of both the characteristics displayed and the specific references from which the information for the characteristics is drawn. These references include public sources: published academic research, publications that serve both an academic and non-academic professional audience, general interest monographs and periodicals, and electronic media outlets; and personal communications with individuals knowledgeable on the topics included in this display.

This invention involves an effort to lay out in one place details of what we know of the biological populations of the earth, and to learn from a global platform how and why over time they came to be where they are and do what they are doing, and from this what they will be doing in the future. In contrast to print media, electronic screen presentations and other two-dimensional exhibits, this platform is a tangible (as differentiated from virtual) four-dimensional (time included) edifice incorporating at one glance many details which credentialed scholars and recognized amateurs have found. As compared to exhibits or dioramas of variable sizes showing local buildings or landscapes with indigenous bioforms, what is proposed here is a capability to present at least a segment of our planet's biological record at many places in time, all at once.

The knowledge to be assembled here is typically gathered by university and college researchers using public and private funding. These fund sources traditionally receive prescribed procedures and data for their investment; i.e., researchers study a particular site, accumulate artifacts and descriptors, and write up analyses and then make an effort to connect multiple sites of the same or differing ages. This invention presents platforms with which such connections can be made. Interactions of environmental data with biological, archaeological, anthropological, and paleontological details can also be derived. The concept described here is then an effort to let researchers from many fields see what others are doing and finding and thereby to enhance knowledge for every worker.

BRIEF SUMMARY OF THE INVENTION

The invention comprises a structure with a coordinating database. The structure consists of an anchoring base; a spine connected to the base; a series of illustrations of the world attached to the spine, each illustration representing a given place in time for Earth, past, present, or a projection of the future; and colors, symbols, text, texture and two-dimensional and three-dimensional artifacts on the illustrations to represent a plurality of details illustrating biological and planetary conditions. In some of a variety of embodiments, the strata also track atmospheric and water-column conditions. The associated database contains explanations of the colors, symbols, text, texture, and artifacts and the sources from which this information is drawn.

Objects of the Invention There are four objects. First, education about biological populations. Second, use of the known locations of populations in place and time to locate gaps in content, so that these gaps can be filled in by extrapolation and interpolation of existing knowledge and by new research. Third, the use of known locations of populations in place and time to infer links between groups: for hominids, for example, networks of trade and other media that connected and spread knowledge and cultures. Fourth, to predict what future conditions will hold.

BRIEF DESCRIPTION OF THE SEVERAL VIEWS OF THE DRAWINGS

Referring to the drawings in which reference numbers represent corresponding parts throughout.

DETAILED DESCRIPTION OF THE INVENTION

Figure 1:
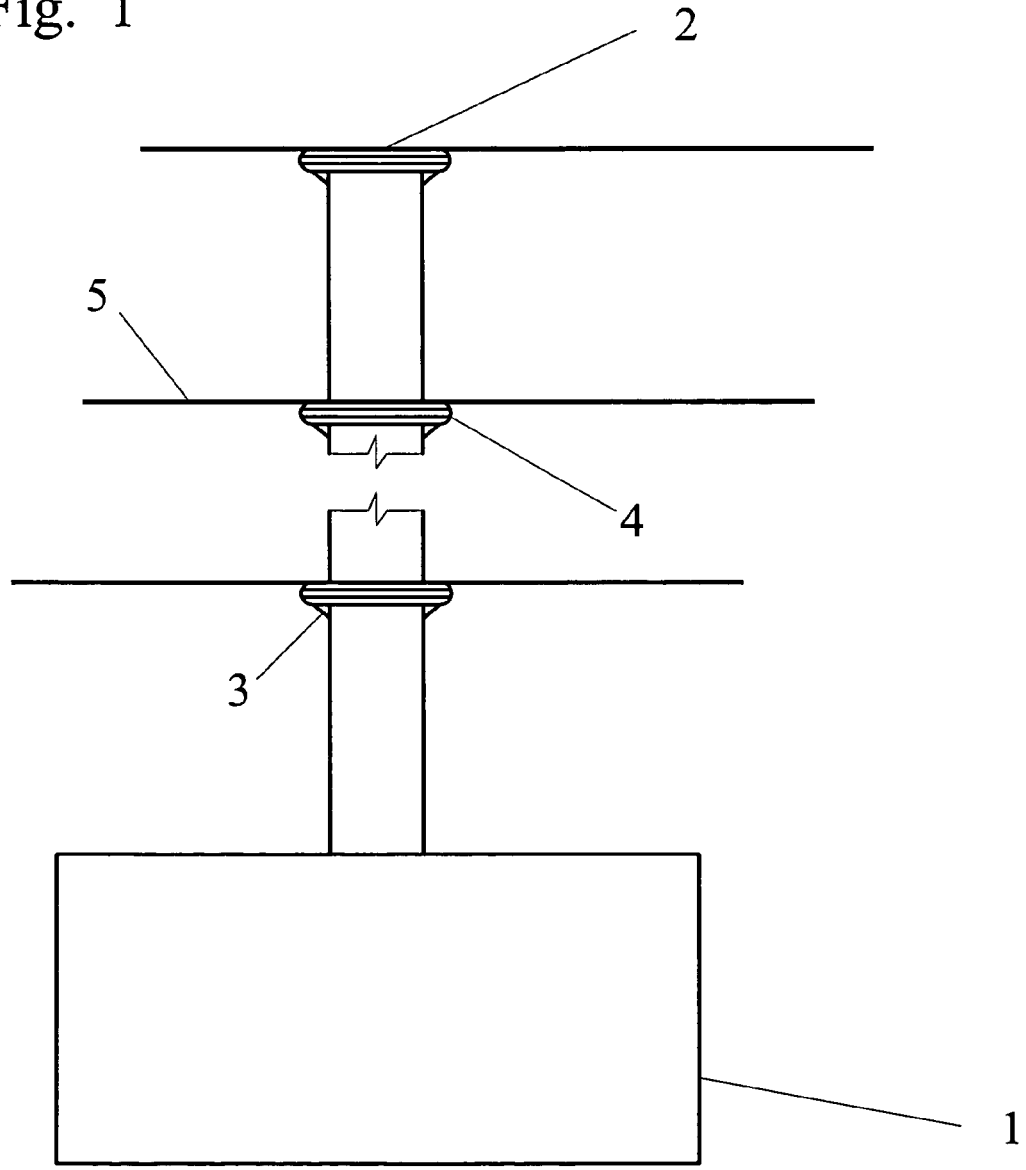
FIG. 1 is an elevation view of one embodiment of the structure showing the components: the anchoring base, the spine extending above the base, and the series of layers for world illustrations set at intervals along the spine by means of supports and rings.
Figure 2:
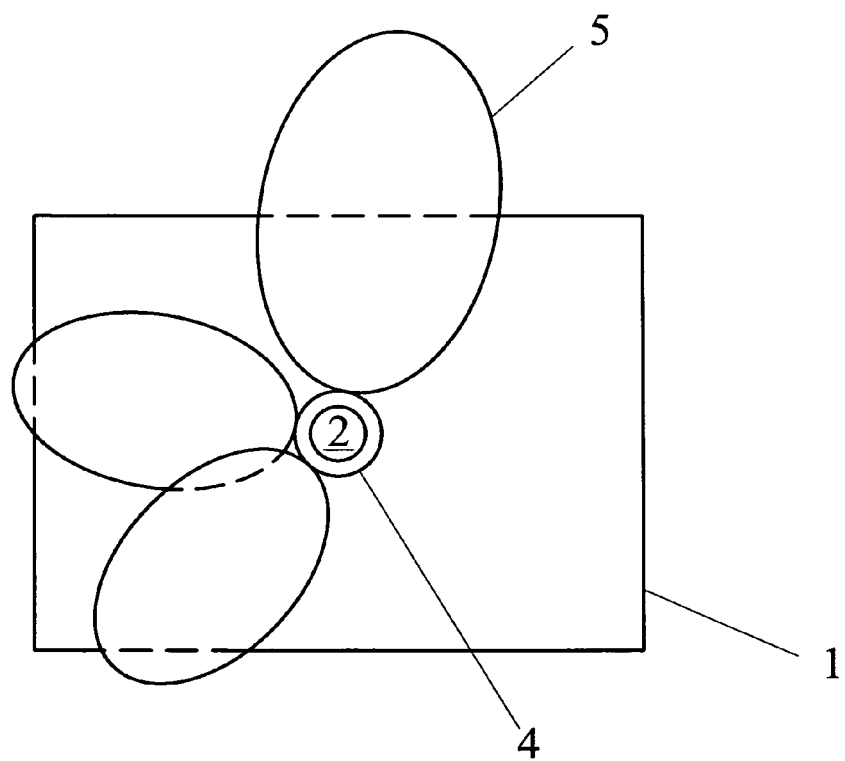
FIG. 2 is a plan view of that structure showing the base, the spine, and the topmost of a series of layers for world illustrations and the topmost ring for that layer; the layer itself comprises a plurality of segments.

Description of the Structure The invention presented here comprises a structure with an accompanying database. The structure consists of an anchoring base (1) in a plurality of shapes and sizes; a spine (2) in a plurality of shapes and sizes; supports (3) in a plurality of shapes and sizes and placed at a plurality of intervals along the height of the spine; rings (4) in a plurality of configurations and sizes and resting on the supports; layers (5) for illustrations of the planet attached to the rings in such manner that the illustrations can revolve around the spine; a plurality of colors, two- and three-dimensional artifacts, symbols and text affixed to the planet illustrations and indicating biological and planetary characteristics (not shown in the figures); the illustration layers have a plurality of textures when indicating features including but not limited to sub-aerial and submarine topography. The symbols and artifacts have a plurality of shapes and sizes. The base and spine are made of a plurality of materials. The supports, rings, illustrations, and symbols are made of a plurality of materials. The artifacts are composed of a plurality of materials and in alternative embodiments include illumination devices and power sources in a plurality of materials, shapes and sizes.

The structure is assembled by a plurality of means using the components given above; each illustration is set up to display data on life forms and their environments for a given place in time, past, present, or future projection. The set of illustrations together provides a representation of biological and planetary change through time.

The exact structure and set of colors, symbols, text, texture, and artifact shape and size must be determined by the users assembling that structure. It is expected that any given structure will represent only a selected part of Earth's existence with only selected life forms and characteristics depicted. Also, new information is incorporated as it becomes available, and so a plurality of presentations of colors, symbols, text, texture, and artifacts is anticipated over the life of any given structure.

Displayed Characteristics Characteristics, that is, factors to be studied, are displayed by means of colors, symbols, text, texture, and artifacts superimposed on planetary illustrations. An explanatory key for the superimposed items is available in an associated database. The characteristics of biological forms include but are not limited to their origin, kind, numbers, locations, changes, interactions with other populations, and lifestyles; environmental characteristics include but are not limited to descriptions of phenomena from the fields of ecology, geography, climatology, oceanography, seismology, magnetometry, and volcanology.

Accompanying Database The database contains the explanatory key for the superimposed items: that is, at least all the information indicated on the illustrations, plus the identification of the references, the sources of the information. Data are organized primarily around latitude and longitude, but cross-referencing provides retrieval by means of any entry. The data are stored on a plurality of media. Records stored on paper are cross-referenced for retrieval by each entry on a given structure. Electronic records are organized according to the commercially available software used and sorted and retrieved by entry. Paper and electronic search and retrieval records can be produced.

What is claimed is:

1. A structure for displaying characteristics describing the biological record of Earth and the planetary environment surrounding that record, and comprising:
    (a) an anchoring base;
    (b) a spine rising from the base;
    (c) supports and rings placed at a plurality of intervals along the height of the spine;
    (d) illustrations of the planet connected to the rings and having colors, symbols, text, texture and artifacts to represent characteristics of the Earth's biological record and the planetary environment surrounding that record;
    (e) with each illustration's information demonstrating a particular place in time, past, present, or future.

* * * * *